Figure 19:
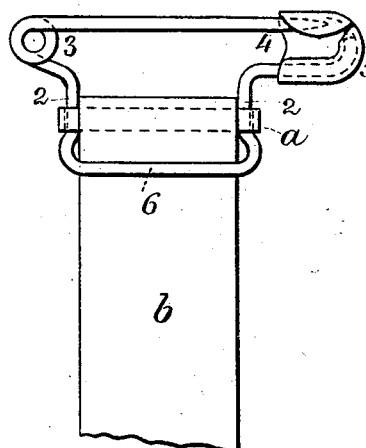

No. 646,651.  
J. V. WASHBURNE.  
STRAP HOLDER.  
(Application filed May 12, 1899.)  
(No Model.)  
Patented Apr. 3, 1900.  
2 Sheets—Sheet 1.
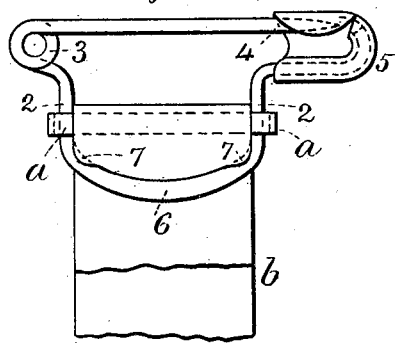  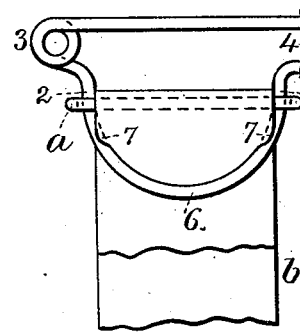 
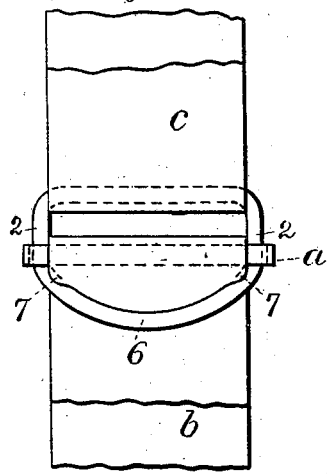  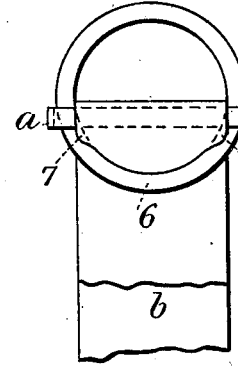 
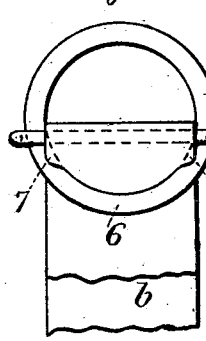  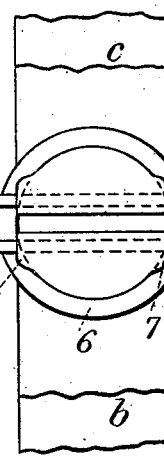 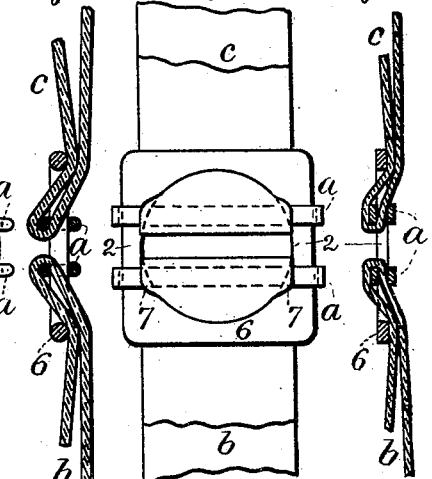
Witnesses:
J. Staib
Chas. H. Smith
Inventor:
James V. Washburne
per L. W. Serrell
Atty.
THE NORRIS PETERS CO., PHOTO-LITHO., WASHINGTON, D. C.

No. 646,651. Patented Apr. 3, 1900.
J. V. WASHBURNE.
STRAP HOLDER.
(Application filed May 12, 1899.)
(No Model.) 2 Sheets—Sheet 2.

Witnesses.
J. Staib
Chas H Smith

Inventor:
James V. Washburne
per L. W. Serrell & Son.
Attys

THE NORRIS PETERS CO., PHOTO-LITHO., WASHINGTON, D. C.

UNITED STATES PATENT OFFICE.

JAMES V. WASHBURNE, OF WATERBURY, CONNECTICUT.

STRAP-HOLDER.

SPECIFICATION forming part of Letters Patent No. 646,651, dated April 3, 1900.

Application filed May 12, 1899. Serial No. 716,496. (No model.)

*To all whom it may concern:*

Be it known that I, JAMES V. WASHBURNE, a citizen of the United States, residing at Waterbury, in the county of New Haven and State of Connecticut, have invented a new and useful Improvement in Strap-Holders, of which the following is a specification.

Strap-holders have heretofore been made in which the strap passes through a wire or metal frame, and in connection with this frame there has been a movable slide-bar around which such strap passed, and this slide-bar has been made with eyes bent up at the ends, said eyes surrounding the side portions of the frame. In this device the strap could be no wider than the length of the slide-bar between the eye ends. Consequently the strap was indifferently held, and in some instances auxiliary devices had to be employed to insure the holding of the strap to the metal frame.

My present invention is designed as an improvement upon the device shown and described in my application for Letters Patent filed August 3, 1898, Serial No. 687,602, which was duly allowed February 20, 1899.

In my present invention I employ a double slide-bar having two parallel or substantially-parallel side members which extend around and embrace the metal frame, and the strap or web passes between the two members of the bar and around one of them, and said double bar under tension applied to the strap grips the strap between one side member of the bar and a portion of the frame. In this construction there are no end eyes to the slide-bar, and a strap of the full width of the opening in the frame can be employed, and thus the strap can be more easily manipulated and better secured to the frame than one that is of a width less than the opening in the frame. At the same time the device is neater in appearance, more effective and compact in form, and the cost of manufacture is extremely low. In my improvement the frame may be curved on one side or upon both sides, and where a frame with a curved inner surface is employed the edges of the strap are nipped against the frame by the action of the bar when the slightest tension is applied. The frame may be curved on one side or on both sides or the frame may have a circular opening, in either of which cases when tension is applied upon the strap the effect is the same. The parallel-sided slide-bar possesses an advantage in that one end of the strap may be received between the members of the bar and the strap may pass around the bar and between the same and the frame, in which case when tension is applied the strap is not only nipped between the bar and the frame, but the two members of the bar are pressed together so as to form a clamp, in which the end of the strap is pinched and held between said parts. In this form when it is desired to hold the end of a strap in place of sewing the bar need have very little, if any, sliding action, as the strap is closely confined between the two members of the bar and a portion of the frame.

I prefer to make the improved bar of rolled or flattened wire; but it may be made of round wire or of ordinary flat sheet metal of the desired temper and thickness. Where the frame is curved on one side, the strap is so securely held that a crosswise movement of the strap in the use of the device, especially where the device is used in connection with hose-supporters, will not have the effect of slipping or pulling the strap gradually and progressively away from the metal frame, because the curved part of the frame not only nips the fabric, but provides for a sliding action of the strap and the bar on the curved portion of the frame. This feature is well adapted to the swinging action of hose-supporters when worn by women or children, where the device is fastened to the corset or to children's underclothing, as in either case there is a forward and backward or swinging motion to the strap of the supporters.

Figure 15:
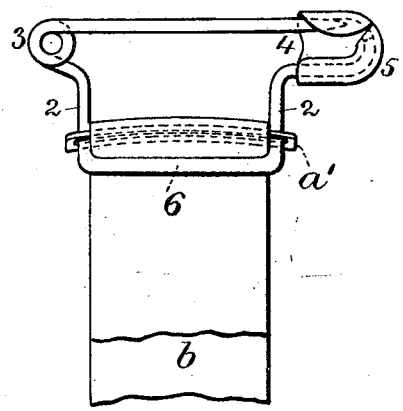

In the drawings, Figures 1 to 7, inclusive, represent by elevations forms of my invention, and Figs. 8 to 14, inclusive, represent by vertical cross-sections the parts shown in Figs. 1 to 7, inclusive, the elevations and cross-sections being grouped in their proper relative positions. Fig. 15 is an elevation, and Fig. 16 a vertical cross-section representing a modification. Fig. 17 is an elevation, and Fig. 18 a vertical cross-section, of another modification. Fig. 19 is an elevation, and Fig. 20 a vertical cross-section, of a modification, showing one end of the strap between the two members of the bar. Fig. 21 is an elevation, and Fig. 22 a vertical cross-section, showing my improvement adapted to a holder for both a straight and diverging strap as applied to a hose-supporter.

The safety-pin, buckle, supporter, or similar article is of any desired size or character, and with special reference to Figs. 1, 2, 3, 7, 8, 9, 10, 14, 15, 16, 19, 20, 21, and 22 the side portions 2 2 of the frame are shown as parallel or nearly so. The frame in Figs. 1, 2, 8 9, 15, 16, 19, and 20 is made a part of the wire of a safety-pin, and I have shown such wire as coiled at 3 and formed with a pin at 4 and a guard 5, that receives the end of the pin, of sheet metal or other suitable material. Where the frame is not part of a safety-pin, it is in all cases adapted either to hold a strap passing to a fixed part of a garment, or the frame is made with a device adapted to be directly fastened.

In Figs. 1, 3, 4, 7, 19, and 21 and the corresponding vertical sections of the same the double slide-bar is shown as made of flat sheet metal, while in Figs. 2, 5, and 6 and the corresponding vertical sections of the same the double slide-bar is shown as made of round wire. Each of these bars $a$ passes across and around the outside of the side portions 2 2 of the frame, which is thus embraced by the bar, and the members of the bar are parallel or substantially parallel and are separated by a longitudinally-arranged central opening, preferably equal to the thickness of the side portions 2 2 of the frame or approximately so.

In the various figures of the drawings, $b$ represents the strap, the same being shown with a short free end and a longer end, to which the tension is applied, and $c$ represents the web of fabric coming to the strap-holder from a stationary or fastening point. Each of the frames is provided in relation to the parallel-sided slide-bar with a cross portion 6, and the nipped points of the strap in relation to the cross-piece and slide-bar are shown at 7. In Figs. 3, 4, 5, and 6 and the cross-sections thereof and Figs. 10, 11, 12, and 13 the frame is shown either as an oblong or round ring, and in reference to these figures I have shown in Fig. 3 a web $c$ as connected to the frame.

By reference to the drawings it will at once be apparent that the frame and the slide-bar are two separate and independent parts and that they are necessarily connected only in an operative sense by the interposition of the strap.

A web may also be connected to the frames, Figs. 4 and 5, and their cross-sections. Figs. 6 and 7 and their cross-sections show frames with two parallel-sided slide-bars, the frames in Figs. 6 and 13 being circular and the frame in Figs. 7 and 14 square, with a circular opening. These latter figures show the frame construction that would be desirable to employ in connection with arm bands or garters where the ends of the strap or elastic fabric are brought together and passed through the opening in the slide-bar over and beneath the frame, the tension being in opposite directions to hold both of the free ends of the strap or elastic fabric, and in the operation of the device little, if any, appreciable difference is manifest, whether the parallel-sided slide-bar be of flattened wire or round wire or of flat sheet metal, unless the difference result from the fact that there are edges to the flattened-wire or sheet-metal members of the bar, which may more securely hold the strap in relation to the frame.

When the forms shown in Figs. 1, 2, 3, 4, and 5 and their corresponding cross-sections are employed, the strap and the double slide-bar holding the same to the frame are capable of a slight swinging movement, which would result, especially where the device is used on children's hose-supporters, from the movements in play, or on the hose-supporters for ladies and misses when bicycle-riding. In this condition it is no more possible for the strap to get away from the fastening than if this side movement did not exist, because the curved form given to that portion 6 of the frame permits this swinging movement without the loss of the gripping action.

Figure 20:
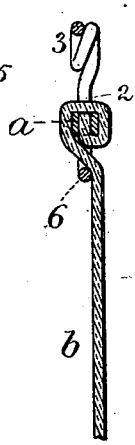
Figure 21:
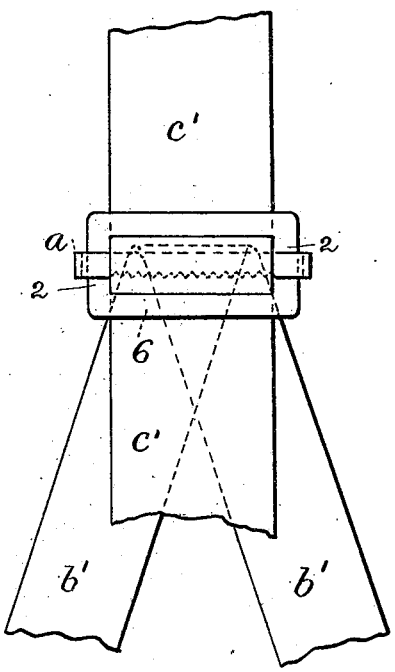

In Figs. 19 and 20 the free end of the strap is shown as held between the two parallel members of the bar, with the strap carried around over the bar and between the same and a portion 6 of the frame. In this form the end of the strap is concealed, and the action of the tension is not only to nip the strap between the bar and a portion of the frame, but to press together the parts of the bar and so hold the end of the strap secure. In this manner of adjustment of the strap both members of the bar are covered by the strap, as is also the under side of the frame, which is an advantage, as the metal of the bar and frame is not liable to blacken the underclothing or person of the wearer.

Figure 16:
Figure 17:
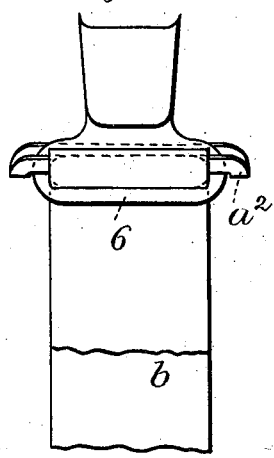

In Figs. 15 and 16 the double slide-bar is cut out of flat sheet metal, with the parallel sides in the same plane, and a slight curvature is given to this bar $a'$; but the action in use of the strap for all practical purposes is the same as in the other forms of the invention hereinafter described.

Figure 18:
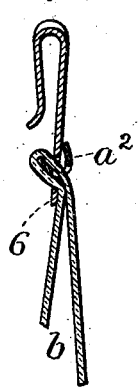
Figure 22:

In the modification, Figs. 17 and 18, the bar $a^2$ has parallel sides, which in cross-section are at a slight inclination to one another, with the connecting ends curved, so that the bar is somewhat of U form in cross-section. The action in this case is in practice the same as that described with reference to the other figures. Figs. 21 and 22 show an application of my improvement wherein a strap $b'$ passes over one of the members of the bar and the edge of the other member of the bar is made with teeth. In this case the web $c'$ passes through the frame and over the side of the member of the bar having the teeth, and when tension is applied the teeth assist in engaging the web $c'$, and the web is held between the bar and the edges of the frame, and a frictional pressure is exerted also upon the strap $b'$, which prevents the same from casually getting out of place. In this form it will be noted also that both the bar and under side of the frame are practically covered, which prevents the device from touching the skin. This would be objectionable, as the perspiration tends to oxidize and corrode the metal.

Teeth or engaging portions may be provided in any or all the different forms of the cross-bar shown to better adapt the device in gripping the strap.

I am aware that heretofore in a strap-holder or garment-supporting device there has been employed a double slide-bar of round wire having two parallel members for the reception of the frame and strap in combination with a rectangular frame. In a broad sense I distinctly disclaim such a device.

In my improvement I employ with a double slide-bar a frame having a curved aperture, as the same more securely nips and holds the strap at opposite corners, and I prefer to make the double slide-bar of flattened metal, as the same possesses greater strength than the round wire, is unyielding in use where the round wire would bend, and, besides, the end of a strap may be received and held between the flat members of the slide-bar, as shown in Fig. 2, which would not be possible with a slide-bar of round wire.

I claim as my invention—

1. The combination with a frame having an aperture of curved outline for the reception of a strap, of a double slide-bar having two members between which is a longitudinally-arranged opening for the reception of the said frame and strap, substantially as specified.

2. The combination with a frame having an aperture for the reception of a strap, of a double slide-bar of flattened metal separate and removable from the frame and having two members extending around and embracing said frame with a longitudinally-arranged opening between the members for the reception of the said frame and strap, substantially as set forth.

3. A strap-holder comprising a safety-pin with part of the wire bent as a curved frame and a double slide-bar having two members extending around and embracing said curved frame with a longitudinally-arranged opening between the members for the reception of the said frame and strap, substantially as specified.

4. In combination with a frame having a circular aperture for the reception of a strap, of a double slide-bar having two substantially-parallel members between which is a longitudinally-arranged opening adapted for the reception of the said frame and strap, substantially as described.

5. In combination with a ring-like frame, of a double slide-bar having two substantially-parallel members between which is a longitudinally-arranged opening for the reception of the said frame and strap, substantially as described.

6. The combination with a frame having an aperture for the reception of a strap, of a double slide-bar of flattened metal having two members between which is a longitudinally-arranged opening, the said frame and strap passing through the opening between the members, and the slide-bar extending around and embracing the frame, substantially as specified.

Signed by me this 5th day of May, 1899.

JAMES V. WASHBURNE.

Witnesses:
PATRICK J. McMAHON,
NOE L. NADEAU.